July 16, 1929.　　　A. R. PRIBIL　　　1,721,316
TROLLEY FOR CHAIN CONVEYERS
Filed Sept. 12, 1928
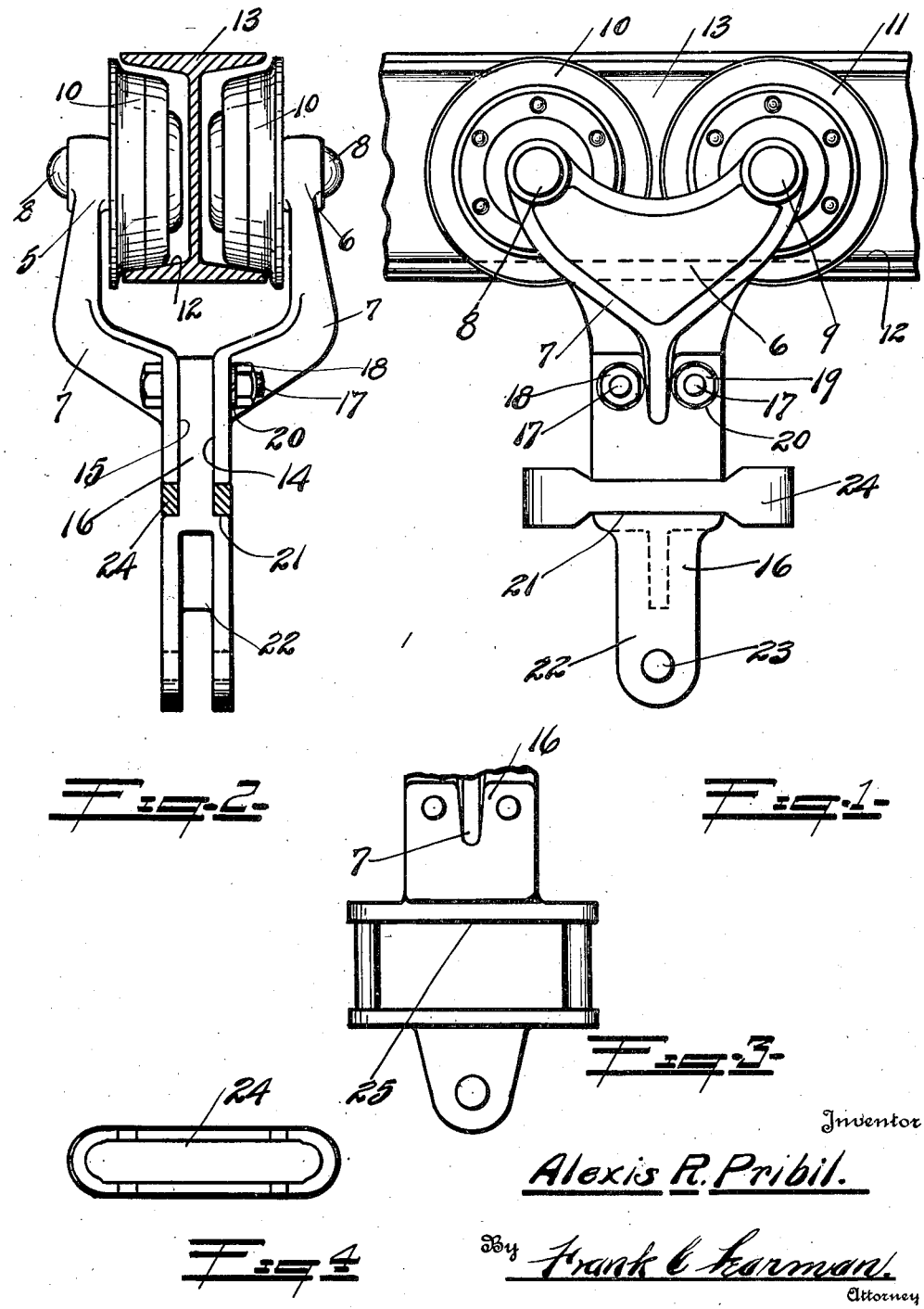

Patented July 16, 1929.

1,721,316

UNITED STATES PATENT OFFICE.

ALEXIS R. PRIBIL, OF SAGINAW, MICHIGAN.

TROLLEY FOR CHAIN CONVEYERS.

Application filed September 12, 1928. Serial No. 305,418.

This invention relates to trolleys for supporting chain conveyers, and particularly to a four wheel trolley adapted to cooperate with a supporting member such as an I-beam or other structural member.

The prime object of the invention is to design a four wheel trolley which can be very economically manufactured, capable of supporting heavy loads and which is smooth and easy running.

A further object is to design a four wheel trolley for supporting extra heavy loads on a comparatively light weight track, and where for various reasons it is impossible to use a heavy track generally necessary and recommended for extra heavy loads.

A still further object is to design a trolley to which any standard or special chain link or attachment can be easily and readily attached, and which readily absorbs all load and chain reactions to which the over head track is subjected.

The above and other objects will appear as the specification progresses, reference being had to the accompanying drawing in which I have shown the preferred embodiment of my invention, and in which like references numerals indicate like parts throughout the several views thereof, it being understood that the invention is susceptible to various changes in construction which may be made within the scope of the claims, without departing from the invention.

In the drawing:

Fig. 1 is a side elevation of the trolley and a portion of the supporting track.

Fig. 2 is an edge view, the supporting member and chain link being shown in section.

Fig. 3 is a fragmentary side view of the trolley, showing another type of chain attachment.

Fig. 4 is a plan of the chain link.

The trolley shown in the accompanying drawing is designed to operate under severe conditions and carry heavy loads on a light track, and where it is impossible to use an I-beam track of a size necesasry to carry heavy loads, and I have therefore designed this four wheel trolley which distributes the weight, so that heavy loads can be carried on a light track.

Referring now particularly to the drawing, the numerals 5 and 6 designate the opposite side brackets respectively of the trolley, which can be formed of a forging or can be cast if desired, being provided with ribs 7 which reinforce the members, the lower ends being arranged in angular relation to the upper portion, so that, when they are placed in assembled relation, the lower ends will converge, and these lower ends are secured together in a manner to be presently described.

Spaced apart openings are provided in the upper ends of the brackets, and are adapted to receive one end of the bolt members 8 and 9 respectively, pressed steel anti-friction bearing and dust proof wheel structures 10 and 11 being rotatably mounted on said bolts, and are adapted to engage and ride on the lower flange 12 of an I-beam track 13 which can be secured in place in any approved manner. Both brackets are constructed identically alike, as are also the wheel structures which are mounted thereon, and I shall therefore describe but one bracket assembly.

The converging lower end of the brackets 5 and 6 are formed with flat inner surfaces 14 and 15, the extreme ends being square and a chain attachment 16 is interposed therebetween, the flat portions, together with the chain attachment being suitably drilled to receive the spaced apart bolts, which are provided with nuts 18 and 19 for clamping the members securely together, washers 20 being interposed between the nut and bracket in the usual manner. The chain attachment is shouldered as shown at 21, the lower end 22 being bifurcated and is provided with an opening 23 adapted to receive a bolt or the like, (not shown), to facilitate the attachment or suspending of a carrier or support to suit the material being conveyed.

A link 24 fits in the channels formed between the lower squared ends of the brackets and the shoulders on the chain attachment, and is formed as clearly shown in Figs. 1, 2 and 4 of the drawing, a standard conveyer chain being attached thereto in the conventional manner. These trolleys are located at spaced apart intervals intermediate the length of the conveyer chain, and each trolley is connected in an identically similar manner.

In Fig. 3 of the drawing I have shown another form of chain attachment or spacer 25 which is rigidly secured between the lower ends of the brackets by means of the bolts 17 and it will be obvious that any special attachment or chain can be used by merely removing the chain attachment and securing the special link in place thereon, the spacing of the bolts being the same as the spacing of the holes in the special links and as used in standard practice.

From the foregoing description it will be obvious that I have perfected a very simple, economical, and rugged four wheel chain conveyer trolley.

What I claim is:—

1. A trolley for supporting a chain conveyer comprising oppositely disposed brackets, each bracket having a pair of spaced apart wheel structures mounted thereon and adapted to engage the sides of a supporting track, a chain attachment secured to the lower ends of said brackets, and a link rigidly mounted on said chain attachment.

2. A four wheel trolley for supporting a chain conveyer comprising a pair of oppositely disposed brackets, each bracket having a pair of wheels mounted thereon in spaced apart relation and adapted to engage a supporting track, a chain attachment removably secured to the lower ends of said brackets and formed with shoulders, the lower end of said chain attachment being bifurcated, and a chain link rigidly mounted on said attachment between said shoulders and the lower ends of said brackets.

3. A four wheel trolley for supporting a chain coveyer comprising a pair of angularly disposed brackets, each bracket having a pair of wheels mounted thereon in spaced apart relation and adapted to engage and travel on a supporting track, a chain attachment secured to the lower ends of said brackets and formed with shoulders intermediate its length, said shoulders being spaced from the ends of the brackets, and a chain link rigidly secured on said attachment between the shoulders and the ends of the brackets.

4. The combination with a trolley support formed with oppositely extending flanges, of a pair of oppositely disposed brackets, each bracket having a pair of wheels mounted thereon in spaced apart relation, a chain attachment detachably secured to the lower ends of said brackets and provided with shoulders, said shoulders being spaced from the ends of said brackets, and a chain link rigidly interposed between said shoulders and the ends of the brackets and to which the links of a chain conveyer are connected.

In testimony whereof I hereunto affix my signature.

ALEXIS R. PRIBIL.